(12) United States Patent
Horn

(10) Patent No.: US 9,182,916 B1
(45) Date of Patent: Nov. 10, 2015

(54) NON-VOLATILE STORAGE SUBSYSTEM WITH ENERGY-BASED PERFORMANCE THROTTLING

(71) Applicant: Western Digital Technologies, Inc., Irvine, CA (US)

(72) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/306,070

(22) Filed: Jun. 16, 2014

Related U.S. Application Data

(63) Continuation of application No. 13/216,177, filed on Aug. 23, 2011, now Pat. No. 8,788,779.

(60) Provisional application No. 61/383,835, filed on Sep. 17, 2010.

(51) Int. Cl.
*G06F 3/06* (2006.01)

(52) U.S. Cl.
CPC ............ *G06F 3/0616* (2013.01); *G06F 3/0655* (2013.01); *G06F 3/0688* (2013.01); *G06F 2206/1014* (2013.01); *G06F 2212/7205* (2013.01)

(58) Field of Classification Search
CPC ........ G06F 1/206; G06F 1/3203; G06F 1/324
USPC ........... 711/103, 154, 167–169; 713/300–340
See application file for complete search history.

(56) References Cited

U.S. PATENT DOCUMENTS

| | | | |
|---|---|---|---|
| 6,856,556 B1 | 2/2005 | Hajeck | |
| 7,126,857 B2 | 10/2006 | Hajeck | |
| 7,159,082 B1 | 1/2007 | Wade | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |

(Continued)

OTHER PUBLICATIONS

Notice of Allowance dated Mar. 7, 2014 from U.S. Appl. No. 13/216,177, 9 pages.

(Continued)

*Primary Examiner* — Ryan Bertram
(74) *Attorney, Agent, or Firm* — Shumaker & Sieffert, P.A.

(57) ABSTRACT

A non-volatile storage subsystem regulates energy consumption by controlling or "throttling" the rate at which memory operations are performed. During relatively idle periods in which few or no memory operations are performed, energy allotments or "counts" are accumulated to reflect unused energy. These accumulated energy counts may then be effectively allocated for use during bursts or other periods of relatively heavy memory activity, such that the memory operations are performed at a relatively high rate without causing a maximum average power consumption to be exceeded.

18 Claims, 4 Drawing Sheets

N= Not Delayed
D= Delayed

(56) References Cited

U.S. PATENT DOCUMENTS

| | | | |
|---|---|---|---|
| 7,936,603 | B2 | 5/2011 | Merry, Jr. et al. |
| 7,962,792 | B2 | 6/2011 | Diggs et al. |
| 8,078,918 | B2 | 12/2011 | Diggs et al. |
| 8,090,899 | B1 | 1/2012 | Syu |
| 8,095,851 | B2 | 1/2012 | Diggs et al. |
| 8,108,692 | B1 | 1/2012 | Merry et al. |
| 8,122,185 | B2 | 2/2012 | Merry, Jr. et al. |
| 8,127,048 | B1 | 2/2012 | Merry et al. |
| 8,135,903 | B1 | 3/2012 | Kan |
| 8,151,020 | B2 | 4/2012 | Merry, Jr. et al. |
| 8,161,227 | B1 | 4/2012 | Diggs et al. |
| 8,166,245 | B2 | 4/2012 | Diggs et al. |
| 8,243,525 | B1 | 8/2012 | Kan |
| 8,254,172 | B1 | 8/2012 | Kan |
| 8,261,012 | B2 | 9/2012 | Kan |
| 8,296,625 | B2 | 10/2012 | Diggs et al. |
| 8,312,207 | B2 | 11/2012 | Merry, Jr. et al. |
| 8,316,176 | B1 | 11/2012 | Phan et al. |
| 8,341,339 | B1 | 12/2012 | Boyle et al. |
| 8,375,151 | B1 | 2/2013 | Kan |
| 8,392,635 | B2 | 3/2013 | Booth et al. |
| 8,397,107 | B1 | 3/2013 | Syu et al. |
| 8,407,449 | B1 | 3/2013 | Colon et al. |
| 8,423,722 | B1 | 4/2013 | Deforest et al. |
| 8,433,858 | B1 | 4/2013 | Diggs et al. |
| 8,443,167 | B1 | 5/2013 | Fallone et al. |
| 8,447,920 | B1 | 5/2013 | Syu |
| 8,458,435 | B1 | 6/2013 | Rainey, III et al. |
| 8,478,930 | B1 | 7/2013 | Syu |
| 8,489,854 | B1 | 7/2013 | Colon et al. |
| 8,503,237 | B1 | 8/2013 | Horn |
| 8,521,972 | B1 | 8/2013 | Boyle et al. |
| 8,549,236 | B2 | 10/2013 | Diggs et al. |
| 8,583,835 | B1 | 11/2013 | Kan |
| 8,601,311 | B2 | 12/2013 | Horn |
| 8,601,313 | B1 | 12/2013 | Horn |
| 8,612,669 | B1 | 12/2013 | Syu et al. |
| 8,612,804 | B1 | 12/2013 | Kang et al. |
| 8,615,681 | B2 | 12/2013 | Horn |
| 8,638,602 | B1 | 1/2014 | Horn |
| 8,639,872 | B1 | 1/2014 | Boyle et al. |
| 8,683,113 | B2 | 3/2014 | Abasto et al. |
| 8,700,834 | B2 | 4/2014 | Horn et al. |
| 8,700,950 | B1 | 4/2014 | Syu |
| 8,700,951 | B1 | 4/2014 | Call et al. |
| 8,706,985 | B1 | 4/2014 | Boyle et al. |
| 8,707,104 | B1 | 4/2014 | Jean |
| 8,713,066 | B1 | 4/2014 | Lo et al. |
| 8,713,357 | B1 | 4/2014 | Jean et al. |
| 8,719,531 | B2 | 5/2014 | Strange et al. |
| 8,724,422 | B1 | 5/2014 | Agness et al. |
| 8,725,931 | B1 | 5/2014 | Kang |
| 8,745,277 | B2 | 6/2014 | Kan |
| 8,751,728 | B1 | 6/2014 | Syu et al. |
| 8,769,190 | B1 | 7/2014 | Syu et al. |
| 8,769,232 | B2 | 7/2014 | Suryabudi et al. |
| 8,775,720 | B1 | 7/2014 | Meyer et al. |
| 8,782,327 | B1 | 7/2014 | Kang et al. |
| 8,788,778 | B1 | 7/2014 | Boyle |
| 8,788,779 | B1 | 7/2014 | Horn |
| 8,788,880 | B1 | 7/2014 | Gosla et al. |
| 8,793,429 | B1 | 7/2014 | Call et al. |
| 2003/0217295 | A1 | 11/2003 | Sadowski |
| 2007/0226403 | A1 | 9/2007 | Son et al. |
| 2008/0172523 | A1 | 7/2008 | Tanaka et al. |
| 2008/0228997 | A1 | 9/2008 | Farhan et al. |
| 2008/0263373 | A1 | 10/2008 | Meier et al. |
| 2010/0023678 | A1 * | 1/2010 | Nakanishi ............... G06F 1/206 711/103 |
| 2010/0174849 | A1 | 7/2010 | Walston et al. |
| 2010/0250793 | A1 | 9/2010 | Syu |
| 2011/0099323 | A1 | 4/2011 | Syu |
| 2011/0122691 | A1 | 5/2011 | Sprouse |
| 2011/0283049 | A1 | 11/2011 | Kang et al. |
| 2012/0260020 | A1 | 10/2012 | Suryabudi et al. |
| 2012/0278531 | A1 | 11/2012 | Horn |
| 2012/0284460 | A1 | 11/2012 | Guda |
| 2012/0324191 | A1 | 12/2012 | Strange et al. |
| 2013/0132638 | A1 | 5/2013 | Horn et al. |
| 2013/0145106 | A1 | 6/2013 | Kan |
| 2013/0290793 | A1 | 10/2013 | Booth et al. |
| 2014/0059405 | A1 | 2/2014 | Syu et al. |
| 2014/0101369 | A1 | 4/2014 | Tomlin et al. |
| 2014/0115427 | A1 | 4/2014 | Lu |
| 2014/0133220 | A1 | 5/2014 | Danilak et al. |
| 2014/0136753 | A1 | 5/2014 | Tomlin et al. |
| 2014/0149826 | A1 | 5/2014 | Lu et al. |
| 2014/0157078 | A1 | 6/2014 | Danilak et al. |
| 2014/0181432 | A1 | 6/2014 | Horn |
| 2014/0223255 | A1 | 8/2014 | Lu et al. |

OTHER PUBLICATIONS

Office Action dated Dec. 5, 2013 from U.S. Appl. No. 13/216,177, 12 pages.

* cited by examiner

NON-VOLATILE STORAGE SUBSYSTEM WITH ENERGY-BASED PERFORMANCE THROTTLING

CROSS-REFERENCE TO RELATED APPLICATIONS

The present application is a continuation of U.S. patent application Ser. No. 13/216,177, filed on Aug. 23, 2011, which claims priority from provisional U.S. Patent Application Ser. No. 61/383,835, filed on Sep. 17, 2010, the specification of which is incorporated herein by reference.

BACKGROUND

1. Technical Field

This disclosure relates to non-volatile storage subsystems, including but not limited to flash drives. More particularly, the disclosure relates to processes for regulating energy consumption within a non-volatile storage device by controlling the rate at which memory operations are performed.

2. Description of the Related Art

Flash drives and other types of non-volatile storage subsystems are commonly designed to be connected to, and powered by, a host computing system via a slot or port of the host system. To prevent overheating and other power-related issues, the storage subsystem is typically designed to operate within certain power constraints. For example, a particular application or slot specification may require the storage subsystem to average no more than X watts, and to maintain "instantaneous" power within Y watts, where Y>X. In many cases, these power constraints impose a meaningful limit on the rate at which the storage subsystem can perform memory operations.

DETAILED DESCRIPTION OF SPECIFIC EMBODIMENTS

Specific embodiments of a storage subsystem and an associated energy-based performance throttling process will now be described with reference to the drawings. This description is intended to illustrate specific embodiments of the invention, and is not intended to be limiting. Thus, nothing in this description is intended to imply that any particular component, step or characteristic is essential. The invention is defined only by the claims.

Figure 1:
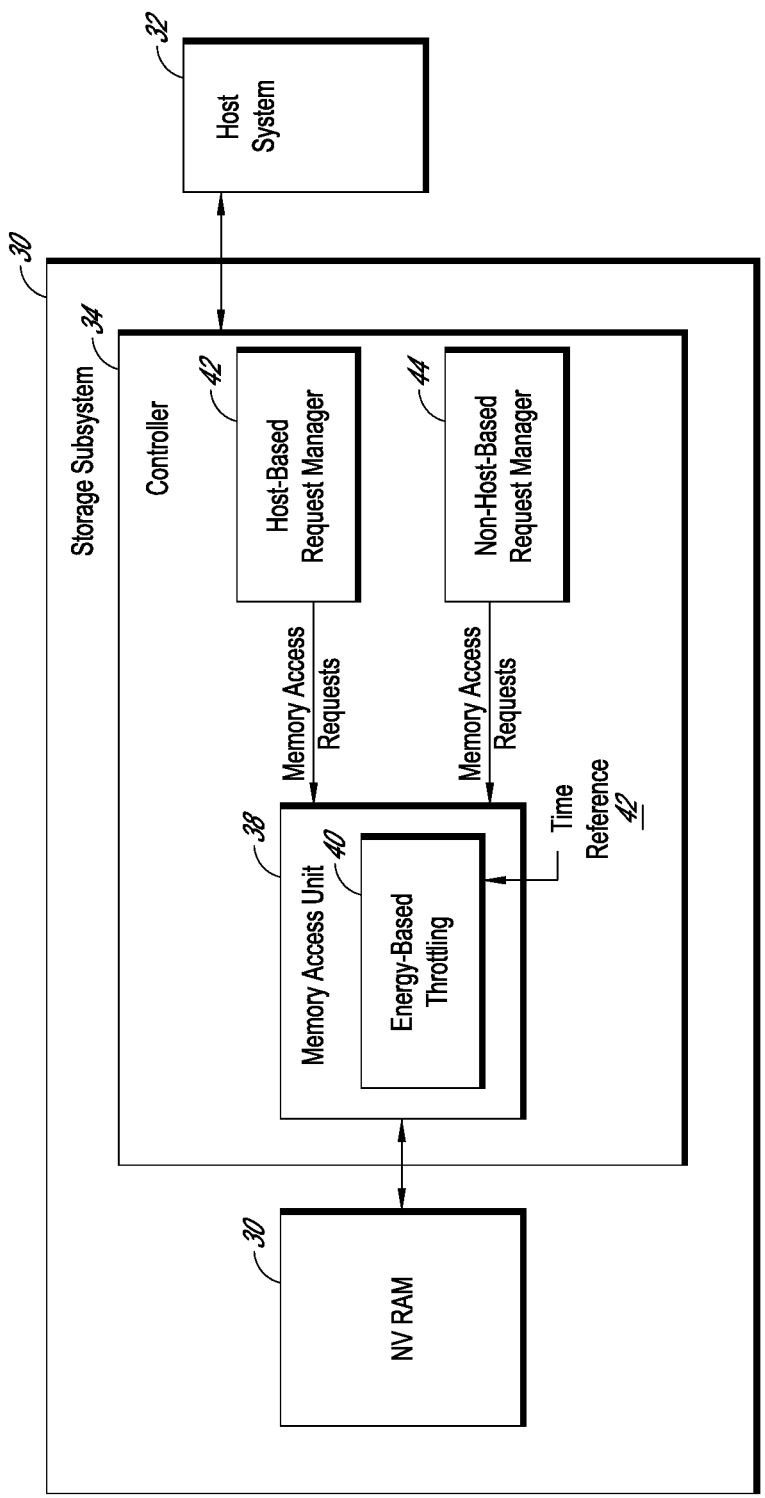
FIG. 1 is a block diagram illustrating a storage subsystem that implements energy-based performance throttling according to one embodiment of the invention.

FIG. 1 illustrates a storage subsystem 30 that implements an energy-based performance throttling process according to one embodiment. The storage subsystem 30 is shown connected to a host computing system 32 that writes and reads data to/from the storage subsystem 30. The storage subsystem 30 may implement an ATA command set and interface, although other command sets and interfaces may additionally or alternatively be used.

As illustrated in FIG. 1, the storage subsystem 30 includes a controller 34 that accesses an array of non-volatile (NV) solid state memory 36, such as an array of flash memory devices. The controller 34 includes a memory access unit 38 that is responsible for accessing the memory array 36. The memory access unit 38 receives memory access requests from at least two sources: a host-based request manager 42 and a non-host-based request manager 44. The host-based request manager 42 issues memory access requests in response to commands received from the host system 32. The non-host-based request manager 44 issues internally-initiated memory access requests, such as memory accesses performed for garbage collection or for coherency redundancy checking.

The storage subsystem 30 typically connects to, and is powered by, the host system 32 via a slot or other connector (not shown) of the host system 32. As described above, in some cases the storage subsystem 30 must be designed to operate within certain power constraints associated with this connector or imposed by a particular application. For example, the storage subsystem 30 may be required to average no more than X watts, and to maintain "instantaneous" power within Y watts, where Y>X. (Typically, the average power is measured over a time period on the order of hundreds of milliseconds, and the instantaneous power is measured over a time period on the order of tens of milliseconds.) One design approach for ensuring compliance with such power restrictions is to merely limit the number of memory dies or devices that can be active concurrently. Another approach is to merely space the memory operations apart in time by a sufficient amount to ensure that the maximum average power is not exceeded. Both of these design approaches unnecessarily limit performance, especially when storage activity is bursty.

To address this issue according to one embodiment, the memory access unit 38 is provided with an energy-based throttling module or unit 40 (hereinafter "throttling module"). The throttling module 40 is responsible for selectively deferring or delaying memory operations as needed to prevent the above-mentioned power constraints from being exceeded. This task is performed such that the storage subsystem's energy consumption rate can temporarily exceed the maximum average power X during bursts, or during other periods in which memory accesses occur at a relatively high rate. For example, if a period of relatively low memory activity is followed by a burst of memory accesses, the unused energy from the low activity period may be effectively allocated for use during the burst period, allowing the burst of memory accesses to be executed at a relatively high rate. Although the storage subsystem's energy consumption rate during the burst may exceed the maximum average power X, the average power over a larger window of time is maintained within this constraint.

To accomplish this task in one embodiment, the throttling module 40 uses a time reference 42, such as a clock, to keep track of energy allotments or "counts" accrued or earned over time. When energy counts are accrued faster than actual energy consumption, the energy counts are accumulated. When a new memory operation is requested, the throttling module 40 determines whether the number of accumulated energy counts is sufficient to perform the operation. If the quantity of accumulated energy counts is sufficient, the requested memory operation is executed without delay; otherwise, the memory operation is deferred until the number of accumulated energy counts reaches a sufficient level.

Figure 2:
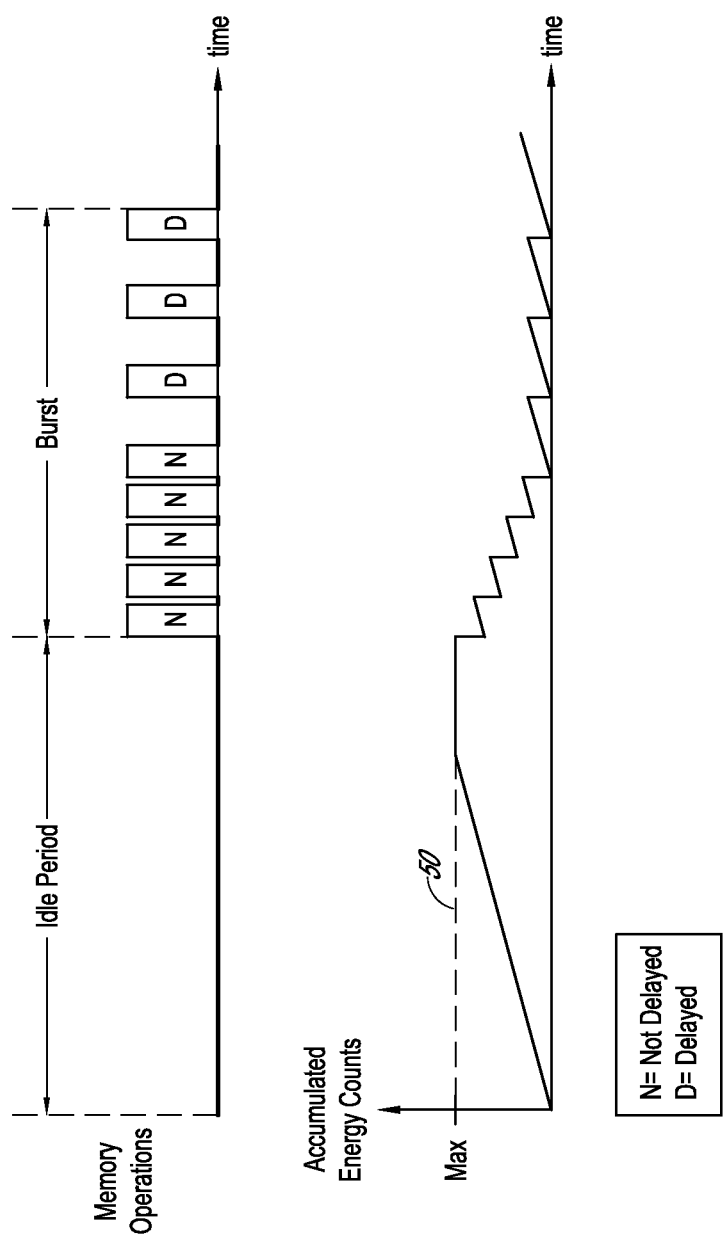
FIG. 2 illustrates the accumulation and use of energy counts in the storage subsystem of FIG. 1.

FIG. 2 illustrates an example sequence in which the throttling module 40 accumulates energy counts during an idle period in which no memory operations are performed, and then makes these energy counts available during a burst period. During the idle period, the number of accumulated energy counts increases at a constant rate until a pre-specified maximum is reached. This maximum value is a design parameter that can be varied to maintain the storage subsystem's instantaneous power within the maximum specified for the particular design or application.

In the example sequence of FIG. 2, the burst includes eight consecutive memory operations. The first five are labeled "N" to signify that they are not delayed as the result of energy-based throttling. The last three are labeled "D" to signify that they have been delayed as the result of throttling. As shown in the lower graph, each time a memory operation is executed, "accumulated energy counts" is decremented to reflect the quantity of energy used to perform the memory operation. Different pre-programmed decrement amounts may be used for different types of memory operations. For example, for memory devices that support page-level read and program operations, different decrement amounts may be used for page read, page program, and block erase operations. For purposes of illustration, the decrement amount in FIG. 2 is the same for all of the memory operations.

For each of the first five memory operations in FIG. 2, the quantity of accumulated energy counts at the time of the memory access request is sufficient to immediately perform the operation. Thus, these first five memory operations are not delayed as the result of energy-based throttling. The fifth memory operation causes the number of accumulated energy counts to reach approximately zero; as a result, the sixth memory operation is delayed until a sufficient number of energy counts are accumulated. The seventh and eighth memory operations are delayed in a similar manner. The rate at which the last three memory operations are performed in this example generally represents the maximum rate at which memory operations can be performed without energy-based throttling. Thus, the use of energy-based throttling decreases the total amount of time required to complete the burst of eight memory operations.

Over the window of time corresponding to the burst in FIG. 2, the storage subsystem's average energy consumption rate exceeds the maximum average power associated with the connector or application. Because the maximum average power is measured over a larger time window, this temporary power surge does not result in a lack of compliance with the specification. Further, by allowing such surges, the throttling process allows the maximum average power level to serve as a target that can be met over extended periods of time.

The particular sequence shown in FIG. 2 is one example of a scenario in which performance is improved as the result of accumulated energy accounts. Similar performance gains can be realized in other scenarios in which a period of relatively low memory activity (in which the energy consumption rate is less than the maximum average energy consumption rate) is followed by a period of relatively high memory activity.

As is apparent from FIG. 2, the extent to which memory operations are delayed depends on two parameters: the energy count accrual rate (represented by the upward slope in the lower graph), and the maximum number of accumulated energy counts (represented by the dashed line 50). These two parameters may be based, respectively, on the maximum average power specification and the maximum instantaneous power specification for the slot or other connector used. The energy consumed by other components and operations of the storage subsystem 30 may also be considered in selecting one or both of these parameters. For example, if the storage subsystem 30 is permitted to operate at a maximum average power of 9 watts, and consumes 3 watts for operations other than non-volatile memory operations, the energy count accrual rate may be set to 6 watts.

In some embodiments, the storage subsystem 30 may implement a non-standard command that enables the host system 32 to adjust one or both of these parameters. The storage subsystem 30 may additionally or alternatively be configured to automatically adjust one or both parameters based on sensor data reflective of environmental conditions. As one example, the storage subsystem 30 may include a temperature sensor that indicates the current temperature in the vicinity of the host's slot or other connector to which the storage subsystem 30 attaches. When this temperature reaches a particular threshold representing an increased risk of failure, the storage subsystem 30 may automatically decrease the energy count accrual rate, and/or the maximum number of accumulated energy counts 50, to increase the extent to which memory operations and energy consumption are spread out over time.

Figure 3:
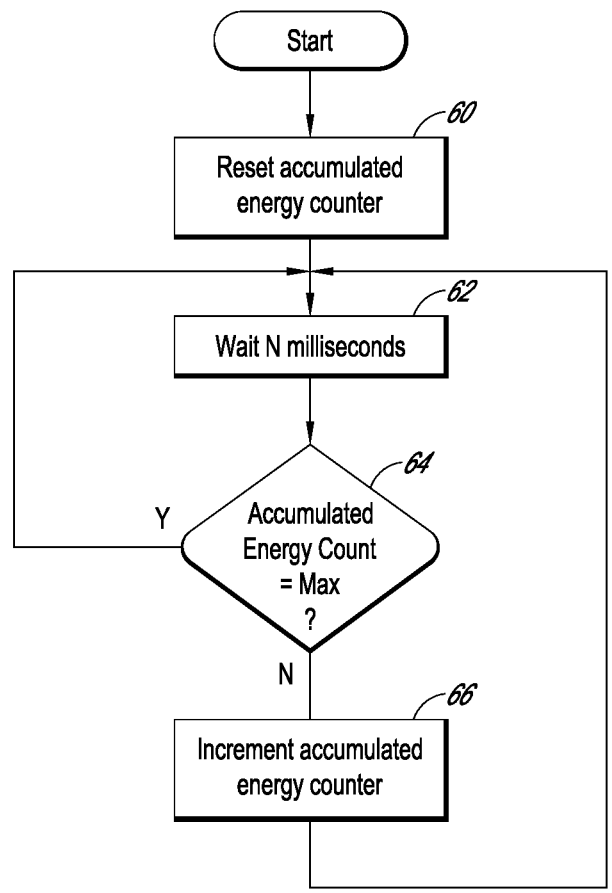
FIGS. 3 and 4 illustrate processes implemented by the energy-based throttling module in the storage subsystem of FIG. 1.
Figure 4:
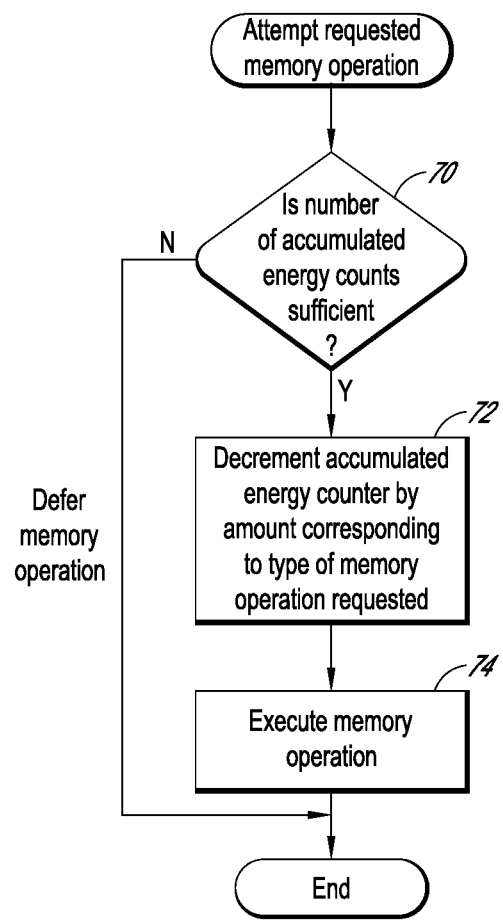

FIGS. 3 and 4 illustrate the processes implemented by the throttling module 40 in one embodiment. These processes may be implemented in firmware code executed by the controller 34, in application-specific logic circuitry of the controller, or in a combination thereof. The processes make use of a counter whose value represents the current number of accumulated energy counts. As illustrated in FIG. 3, this counter is reset to zero (block 60) when the storage subsystem 30 is powered up. Thereafter, the counter is incremented every N milliseconds unless the counter is currently at the maximum value (blocks 62-66). The value of N and the increment amount collectively specify the energy count accrual rate. This accrual rate may be viewed as the target average energy consumption rate for memory operations.

FIG. 4 illustrates the steps performed by the throttling module 40 to process a host-initiated or internally-initiated request for a memory operation. As shown in block 70, the process initially determines whether the number of accumulated energy counts is sufficient to perform the requested operation. This determination may be made by comparing the counter value to the number of units of energy required to perform the particular type of memory operation requested. For example, if the memory operation is a page write operation that consumes ten units of energy, the process would determine whether the counter is at ten or above. If the quantify of accumulated energy counts is insufficient, the process ends and the requested memory operation is deferred until the next request-attempt cycle. As shown in block 72 and 74 of FIG. 4, if the accumulated energy count is sufficient, the process decrements the counter by the number of units of energy required, and executes the operation. When a requested memory operation is deferred, the process shown in FIG. 4 is repeated sufficiently frequently, or is triggered based on energy accumulation events, so that the operation will be executed substantially immediately after the counter reaches the necessary level.

In some embodiments, the storage subsystem 30 may be capable of executing one or more relatively low power memory operations while one or more higher power memory operation are in a deferred/pending state. For example, if a write operation is deferred due to a lack of sufficient accumulated energy counts, the controller 34 may execute one or more lower-power read operations before executing the deferred write operation. The controller 34 may implement appropriate logic for determining which memory operations that can be executed out-of-order.

As will be apparent, numerous variations to the processes of FIGS. 3 and 4 are possible. For example, rather than maintaining a single counter that represents the accumulated energy count, two counters may be used: one which represents total accrued energy counts since power-up, and one which represents total energy consumed by memory operations since power-up. As memory operations are requested, these two counters may be compared to determine the current quantity of accumulated energy counts. As another example, additional steps may be added to appropriately adjust the accumulated energy count based on power-consuming operations that do not involve the NV memory array 36.

In some embodiments, the storage subsystem 30 may include a capacitor that acts as an energy reservoir for performing memory operations. Where such a capacitor is present, the processes of FIGS. 3 and 4 may be modified to account for current into and out of the capacitor over time.

As will be apparent, the throttling features described above are not limited to storage subsystems that include flash memory. The disclosed features may also be used with storage subsystems that use other types of memory devices, such as M-RAM (magneto-resistive RAM) or PC-RAM (phase change RAM) devices.

The features and attributes of the specific embodiments disclosed above may be combined in different ways to form additional embodiments, all of which fall within the scope of the present disclosure. Although certain embodiments have been disclosed, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A data storage system capable of regulating energy consumption by controlling memory operations, the data storage system comprising:
    a non-volatile memory array; and
    a controller configured to:
        access the non-volatile memory array in response to commands received from a host system;
        maintain energy count data representing accumulated energy counts available for performing memory operations in the non-volatile memory array, the energy count data reflecting at least (1) the energy counts accrued at a rate over time up to a maximum energy count and (2) energy consumed by actual memory operations;
        adjust, based at least on sensor data reflective of environmental conditions associated with at least one of the non-volatile memory array and the controller, at least one of (1) the rate of accrual of the energy counts and (2) the maximum energy count; and
        control a rate or timing at which the memory operations are performed in the non-volatile memory array based at least on the energy count data and the sensor data.

2. The data storage system of claim 1, wherein the controller is further configured to decrease the rate or delay the timing at which the memory operations are performed in response to determining that the sensor data indicates an increased risk of failure associated with at least one of the non-volatile memory array and the controller due to the environmental conditions.

3. The data storage system of claim 1, wherein in response to determining that the sensor data indicates an increased risk of failure associated with at least one of the non-volatile memory array and the controller due to the environmental conditions, the controller is further configured to decrease at least one of (1) the rate of accrual of the energy counts and (2) the maximum energy count.

4. The data storage system of claim 3, wherein in response to determining that the sensor data indicates the increased risk of failure, the controller is further configured to decrease both the rate of accrual of the energy counts and the maximum energy count.

5. The data storage system of claim 3, wherein the sensor data comprises data indicative of a current temperature of an interface between the host system and the data storage system, and the controller is further configured to determine that the sensor data indicates the increased risk of failure when the current temperature exceeds a temperature threshold.

6. The data storage system of claim 1, wherein the sensor data comprises data indicative of a current temperature of an interface between the host system and the data storage system, and the controller is further configured to, in response to determining that the current temperature exceeds a temperature threshold, decrease the rate or delay the timing at which the memory operations are performed.

7. The data storage system of claim 6, further comprising a temperature sensor configured to generate the sensor data.

8. The data storage system of claim 1, wherein the controller is further configured to, in accordance with a parameter adjustment command received from the host system, decrease the rate or delay the timing at which the memory operations are performed.

9. A data storage system capable of regulating energy consumption by controlling memory operations, the data storage system comprising:
    a non-volatile memory array; and
    a controller configured to:
        access the non-volatile memory array in response to commands received from a host system;
        maintain energy count data representing accumulated energy counts available for performing memory operations in the non-volatile memory array, the energy count data reflecting at least (1) the energy counts accrued over time and (2) energy consumed by actual memory operations;
        control a rate or timing at which the memory operations are performed in the non-volatile memory array based at least on the energy count data and sensor data reflective of environmental conditions associated with at least one of the non-volatile memory array and the controller;
        keep track, via the energy count data, of the energy counts accumulated during an idle period;
        make the energy counts accumulated during the idle period available during a burst memory access period such that energy consumption during the burst memory access period temporarily exceeds a target average energy consumption rate;
        update the energy count data such that the energy counts are accrued at a rate corresponding to the target average energy consumption rate; and
        use the energy count data to enable the target average energy consumption rate to be temporarily exceeded during burst sequences of memory operations.

10. A method of regulating energy consumption in a data storage system that comprises a controller and a non-volatile memory array, the method comprising:
    accessing the non-volatile memory array in response to commands received from a host system;
    maintaining energy count data representing accumulated energy counts available for performing memory operations in the non-volatile memory array, the energy count data reflecting at least (1) the energy counts accrued at a rate over time up to a maximum energy count and (2) energy consumed by actual memory operations;

adjusting, based at least on sensor data reflective of environmental conditions associated with at least one of the non-volatile memory array and the controller, at least one of (1) the rate of accrual of the energy counts and (2) the maximum energy count; and controlling a rate or timing at which the memory operations are performed in the non-volatile memory array based at least on the energy count data and the sensor data, wherein the method is implemented by the controller.

11. The method of claim 10, further comprising decreasing the rate or delaying the timing at which the memory operations are performed in response to determining that the sensor data indicates an increased risk of failure associated with at least one of the non-volatile memory array and the controller due to the environmental conditions.

12. The method of claim 10, further comprising, in response to determining that the sensor data indicates an increased risk of failure associated with at least one of the non-volatile memory array and the controller due to the environmental conditions, decreasing at least one of (1) the rate of accrual of the energy counts and (2) the maximum energy count.

13. The method of claim 12, further comprising in response to determining that the sensor data indicates the increased risk of failure, decreasing both the rate of accrual of the energy counts and the maximum energy count.

14. The method of claim 12, wherein the sensor data comprises data indicative of a current temperature of an interface between the host system and the data storage system, and further comprising determining that the sensor data indicates the increased risk of failure when the current temperature exceeds a temperature threshold.

15. The method of claim 10, wherein the sensor data comprises data indicative of a current temperature of an interface between the host system and the data storage system, and further comprising, in response to determining that the current temperature exceeds a temperature threshold, decreasing the rate or delaying the timing at which the memory operations are performed.

16. The method of claim 15, further comprising generating the sensor data with a temperature sensor.

17. The method of claim 10, further comprising, in accordance with a parameter adjustment command received from the host system, decreasing the rate or delaying the timing at which the memory operations are performed.

18. A method of regulating energy consumption in a data storage system that comprises a controller and a non-volatile memory array, the method comprising:

accessing the non-volatile memory array in response to commands received from a host system;

maintaining energy count data representing accumulated energy counts available for performing memory operations in the non-volatile memory array, the energy count data reflecting at least (1) the energy counts accrued over time and (2) energy consumed by actual memory operations;

controlling a rate or timing at which the memory operations are performed in the non-volatile memory array based at least on the energy count data and sensor data reflective of environmental conditions associated with at least one of the non-volatile memory array and the controller;

keeping track, via the energy count data, of the energy counts accumulated during an idle period;

making the energy counts accumulated during the idle period available during a burst memory access period such that energy consumption during the burst memory access period temporarily exceeds a target average energy consumption rate;

updating the energy count data such that the energy counts are accrued at a rate corresponding to the target average energy consumption rate; and using the energy count data to enable the target average energy consumption rate to be temporarily exceeded during burst sequences of memory operations, wherein the method is implemented by the controller.

* * * * *